C. H. GENTH AND W. KLINE.
COMBINED MEASURING AND DISPENSING DEVICE.
APPLICATION FILED JUNE 7, 1920.
1,392,490.
Patented Oct. 4, 1921.
2 SHEETS—SHEET 2.
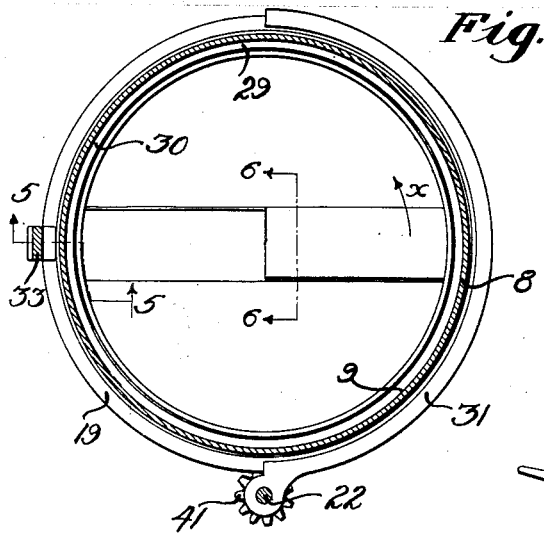
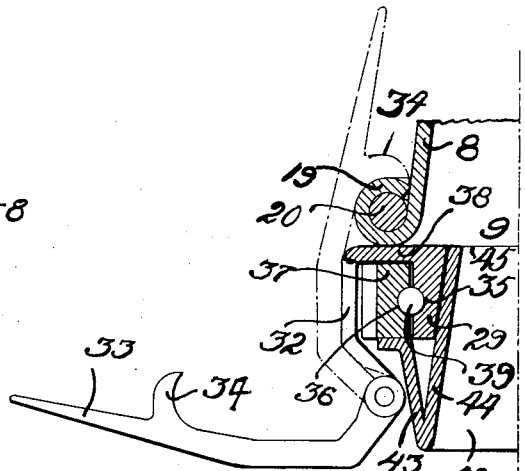
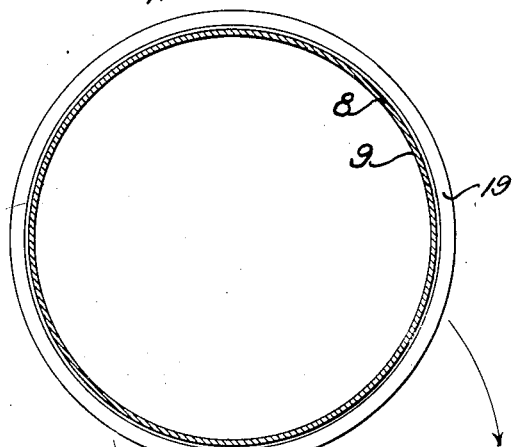
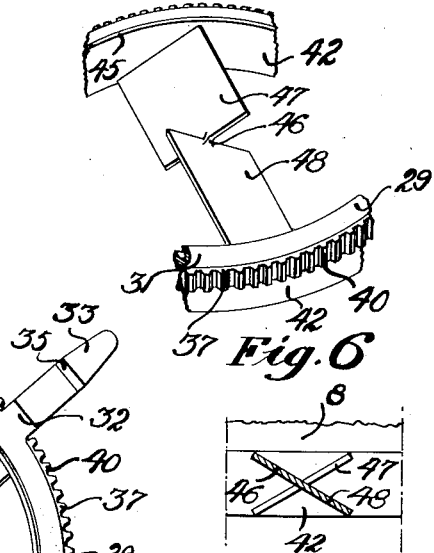
Inventors
Charles H. Genth
William Kline

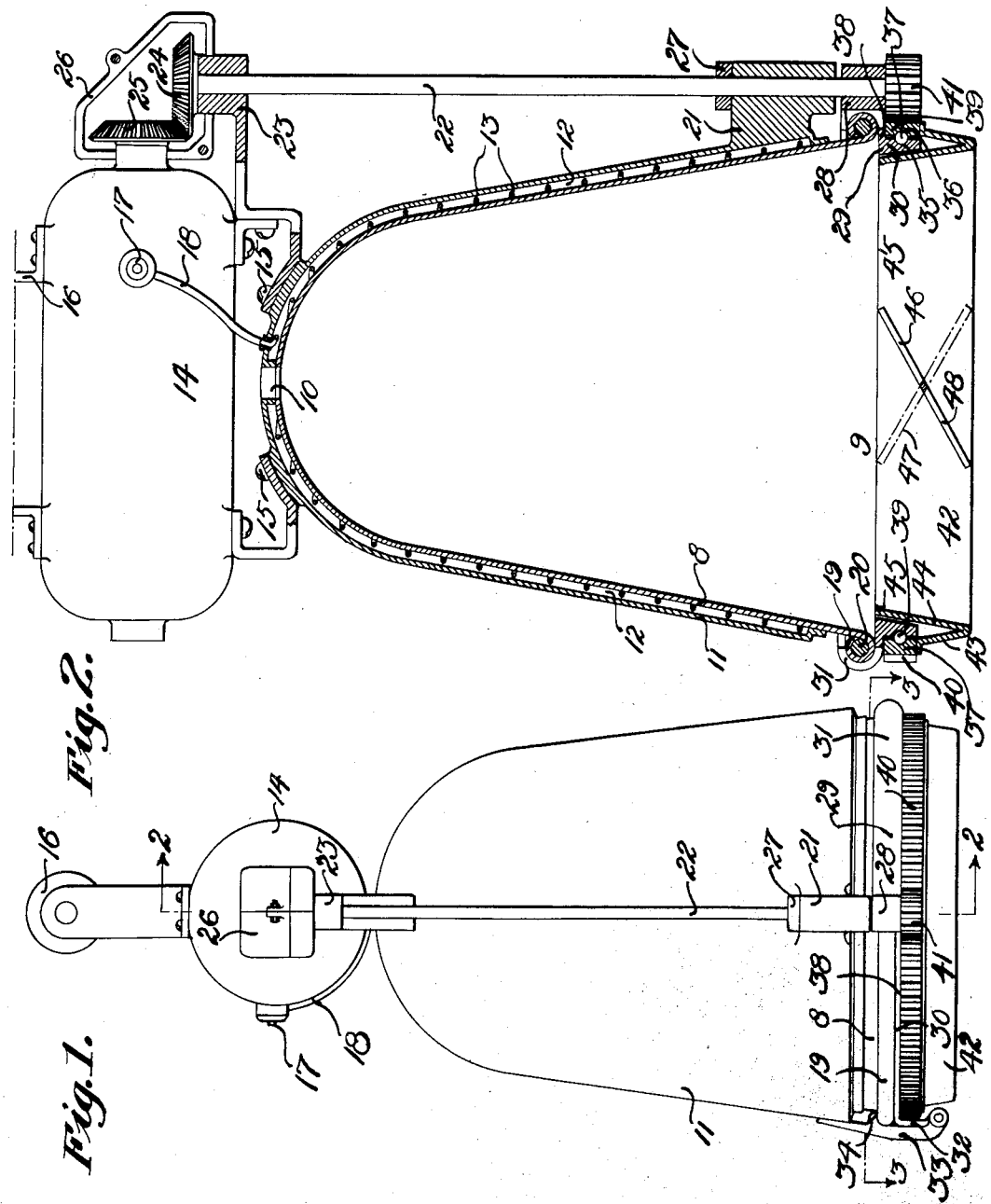

UNITED STATES PATENT OFFICE.

CHARLES H. GENTH AND WILLIAM KLINE, OF PHILADELPHIA, PENNSYLVANIA.

COMBINED MEASURING AND DISPENSING DEVICE.

1,392,490.  Specification of Letters Patent.  Patented Oct. 4, 1921.

Application filed June 7, 1920. Serial No. 386,942.

*To all whom it may concern:*

Be it known that we, CHARLES H. GENTH and WILLIAM KLINE, citizens of the United States, residing at Philadelphia, county of Philadelphia, and State of Pennsylvania, have invented certain new and useful Improvements in Combined Measuring and Dispensing Devices, of which the following is a specification.

Various forms of dippers have been made for the purpose of dispensing ice cream; it being necessary to insert the dipper or spoon into the can of ice cream and force the same by hand through the body of ice cream in order to fill the dipper or spoon. This operation, when the ice cream is hard, is quite difficult and laborious especially where large quantities of ice cream are dispensed in ice cream saloons and at soda water fountains or other places where ice cream is sold. In addition to the above mentioned difficulty in removing the ice cream from the can, the ice cream often adheres to the spoon or dipper and here again renders the dispensing slow and tedious.

One object of our invention is to provide a combined measuring and dispensing device which may be driven by a motor and which will be automatically operative to measure and easily dispense measured quantities of ice cream.

Another object is to so make our invention that it can be easily manipulated and will be of a comparatively simple and durable construction.

These objects, and other advantageous ends which will be described hereinafter, we attain in the following manner, reference being had to the accompanying drawings in which—

Figure 1 is a side elevation showing our improved ice cream measuring and dispensing device, Fig. 2 is an enlarged sectional elevation taken on the line 2—2 of Fig. 1, Fig. 3 is a sectional plan view taken on the line 3—3 of Fig. 1, Fig. 4 is a view of similar character to Fig. 3 showing the parts opened to permit the discharge of the ice cream from the measuring container, Fig. 5 is a fragmentary section taken on the line 5—5 of Fig. 3 and drawn on an enlarged scale showing the latch moved to its released position as illustrated in full lines and also illustrating said latch in its locking position in dot-and-dash lines, Fig. 6 is a fragmentary section taken on the line 6—6 of Fig. 3, and Fig. 7 is a fragmentary perspective view showing a propeller which is operative to fill the measuring container with ice cream during the operation of the device.

Referring to the drawings, 8 represents a measuring container which is preferably made of metal which tapers upwardly from an open mouth 9 and is closed at its top with the exception of a vent hole 10 which we preferably employ. The upper portion of the measuring container is curved so as to provide an even smooth continuous inner surface for the container to facilitate the discharge of the ice cream as will be apparent from the following description. A jacket or shell 11 surrounds the major portion of the container 8 and provides a space 12 which includes a wire coil 13. The top of the jacket 11 forms a support for an electric motor 14; said motor being preferably detachably secured to said jacket by screws 15. The motor 11 has a handle 16 and a push button or other suitable electric switch 17 is provided preferably on the motor and is in connection by a wire 18 with the wire coil 13 and with any suitable source of electric current supply. The wire of the coil 13 may be made of any high resistance material such as German silver so that when current is passed therethrough by operating the button or switch 17, the coil 13 will be heated so as to heat the measuring container 8 for the purpose of loosening the ice cream within the container and permitting it to be discharged therefrom as will hereinafter be described.

The lower end of the container 8 is bent outwardly in the form of a bead 19; said bead preferably including a reinforcing wire core 20. The measuring container 8 includes a bearing lug 21 which forms a rotatable bearing for an operating and pivot shaft 22; said shaft at its upper end being journaled in a bearing 23 secured to the motor 14. A bevel gear 24 is secured to the shaft 22 above the bearing 23 and meshes with another bevel gear 25 which is connected to the driving shaft of the motor 14. The two gears 24 and 25 are preferably covered by a gear box 26 which may be of any suitable construction. A collar 27 is preferably secured to the shaft 22 above the lug 21 and the shaft 22 below the lug 21 passes through a lug 28 which projects from a ring 29 at a level preferably in line with the bead 19 of the measuring container 8.

The continuous portion 30 of the ring 29 is located directly below the beaded lower end of the measuring container 8 and from this portion 30 of the ring 29 there is an upturned flange 31 which extends substantially a distance equal to one half the circumference of the ring 29 as clearly shown in Figs. 3 and 4. It will thus be noted that the ring 29 is adapted to pivot on the shaft 22 in a plane parallel with the bottom of the measuring container 8; such pivotal movement being clearly illustrated in Fig. 4. The upturned flange 31 is adapted to embrace the bead 19 of the measuring container as shown in Fig. 2 and the ring 30 has a bracket extension 32 at a point diametrically opposite the upturned flange 31 to which is pivoted a latch 33; said latch having a portion 34 adapted to be forced upwardly over the bead 19 of the container 8 so as to prevent the ring 29 from rotating relatively to the container. The portion 30 of the ring 29 has an annular groove 35 on its outer surface arranged opposite a groove 36 on the inner surface of another ring 37; said ring 37 being located under the outwardly extending flange 38 on the ring 29.

Ball bearings 39 are placed within the race formed by the grooves 35 and 36 and in this manner the ring 37 is rotatable and freely supported in a position surrounding the portion 30 of the ring 29. The outer or peripheral surface of the ring 37 has gear teeth 40 adapted to mesh with a pinion 41 on the lower end of the shaft 22. Thus when the shaft 22 is rotated by the motor 14, the pinion 41 will rotate the ring 37. A collar 42, which is substantially V-shape in cross section, has one leg 43 secured to the under surface of the ring 37 and the other leg 44 extending upwardly to a position so that its top edge 45 is adjacent the open mouth 9 of the measuring container 8.

A propeller 46 includes two sections 47 and 48 which are in the form of plates arranged at inclined angles to each other in X-formation as clearly shown in Figs. 2, 3, 4, 6 and 7. The plate portion 47 is connected to the inner surface of the leg 44 of the collar 42 and the plate 48 is also connected to the inner surface of the leg 44 of the collar 42 at a point diametrically opposite the connection between the plate 47 and the leg 44 of the collar 42. Thus the collar 42 will be rotated by the ring 37 in the direction of the arrow $x$ in Fig. 3, and when it is desired to fill the container 8 and dispense the measured quantity of ice cream, the device is lowered into a receptacle containing the ice cream and the motor is started by any suitable switch. The plates 47 and 48 of the propeller 46 will then cut into the body of ice cream in the receptacle and convey the ice cream upwardly into the container 8. When the container has become filled, the motor is stopped and the latch 33 is swung so as to release the bead 19 and the ring 29 is then swung from the position shown in Fig. 3 to the position shown in Fig. 4. This frees the entire bottom of the container 8 and the push button or switch 17 is then operated to cause the heating of the coil 13 to loosen the body of ice cream within the container by slightly melting the ice cream immediately adjacent the inner surface of the container and the entire body of ice cream within the container will drop out into any vessel placed to receive the same.

The vent 10 permits any air which is within the container to escape out of the top during the filling of the container and the entire device can be quickly operated since it takes comparatively little time for the propeller to fill the container and in view of the fact that the plates 47 and 48 of the propeller are operating on portions of the mass of ice cream within the receptacle at opposite points of the axis of rotation of the collar 42, a twisting movement of the entire device will be prevented.

While we have described our invention as taking a particular form, it will be understood that the various parts of our invention may be changed without departing from the spirit thereof, and hence we do not limit ourselves to the precise construction set forth, but consider that we are at liberty to make such changes and alterations as fairly come within the scope of the appended claims.

Having thus described our invention, what we claim as new and desire to secure by Letters Patent is:—

1. A measuring container adapted to be projected into a receptacle containing material to be measured out and including an open mouth; and a propeller located adjacent said open mouth and operative when advanced into said material to move material into said container through said mouth; substantially as described.

2. A measuring container adapted to be projected into a receptacle containing material to be measured out and including an open mouth; and a propeller rotatable adjacent said open mouth and having portions arranged at oppositely disposed angles including the axis of rotation; substantially as described.

3. A container having an open mouth; and a rotatably mounted collar having a propeller secured thereto and extending transversely inward thereof and adapted to move material into said container through said mouth; substantially as described.

4. A container having an open mouth; and a rotatably mounted collar having a propeller extending transversely inward thereof and adapted to move material into said container through said mouth, said propeller having portions extending at angles to each other at points oppositely disposed with respect to the axis of rotation; substantially as described.

5. A measuring container having an open mouth; and means located adjacent said mouth and adapted, when moved into a mass of material, to convey said material into said container; substantially as described.

6. A container having an open mouth; means located adjacent said mouth and adapted, when moved into a mass of material, to convey said material into said container; and means forming a movable connection between said container and conveying means whereby the conveying means can be moved laterally away from axial alinement with said mouth to permit the material to be discharged from said container through said mouth; substantially as described.

7. A container having an open mouth; a ring in alinement with said mouth; a propeller rotatably supported by said ring; and means for rotating said propeller and located at a position farther remote from the axis of rotation than are parts of said propeller whereby material is movable through said ring into said container; substantially as described.

8. A container having an open mouth; a ring in alinement with said mouth; a collar rotatably supported by said ring; a propeller extending transversely across the space within said collar and in alinement with the mouth of the container; and means for rotating said collar whereby when said collar is projected in the material, said propeller will move said material into said container; substantially as described.

9. A container having an open mouth; a ring in alinement with said mouth; a propeller rotatably supported by said ring; means forming a pivotal connection for said ring whereby the ring and propeller can be moved into a position entirely clear of said mouth of the container; and means for rotating said propeller; substantially as described.

10. A container having an open mouth; a ring in alinement with said mouth; a propeller rotatably supported by said ring; means forming a pivotal connection for said ring whereby the ring and propeller can be swung in a plane substantially parallel with said mouth to entirely free said mouth; and means for rotating said propeller; substantially as described.

11. A container having an open mouth at one end; a ring adjacent said end of the container and detachably secured in said position; and means rotatably supported by and extending inwardly toward the axis of said ring and operative to move material through said ring into said container through its open mouth; substantially as described.

12. A container having an open mouth at one end; a ring adjacent said end of the container and detachably secured in said position; a collar rotatably supported by said ring; and a propeller positioned within and secured to said collar and operative to move material, into which said collar is projected, into said container; substantially as described.

13. A container having an open mouth at one end; a ring adjacent said end of the container and detachably secured in alinement with said mouth; a second ring rotatably supported by said first ring and including gear teeth; a propeller rotatably supported by said second ring and in alinement with said mouth; a rotatably mounted operating shaft; and a driving pinion on said shaft for engagement with the teeth on said second mentioned ring; substantially as described.

14. A container having an open mouth at one end; a ring pivotally connected with respect to said container and adapted to swing in a path substantially parallel with said end of the container; a propeller rotatably supported on said ring; and means for rotating said propeller; substantially as described.

15. A container having an open mouth at one end, said end including a projecting bead; a ring having a portion adapted to swing in a path parallel with said end of the container into and out of alinement with said mouth, said ring having a portion adapted to embrace said bead; a latch connected to said ring and movable into embracing action with said bead of the container at a position remote from said first embracing portion of the ring whereby said ring is detachably secured in position in alinement with said mouth of the container; a propeller supported by said ring; and means for actuating said propeller to move material through said ring into said container; substantially as described.

16. A container having an open mouth; a ring supported adjacent said open mouth; a second ring rotatably supported in a position surrounding said first ring; a collar having a portion extending from said second mentioned ring and another portion extending within said first ring; a propeller positioned within said collar; and means for rotating said collar; substantially as described.

17. A container having an open mouth; a ring supported adjacent said open mouth; a second ring rotatably supported in a position surrounding said first ring and including gear teeth; a collar having a portion extending from said second mentioned ring and another portion extending within said first ring; a propeller positioned within said collar; a rotatably mounted operating shaft; and a driving pinion on said operating shaft meshing with the teeth of said second mentioned ring; substantially as described.

18. A container having an open mouth at one end; a ring; an operating shaft, said ring having a lug pivotally supported in axial alinement with said operating shaft; a ring rotatably supported by said first ring and having gear teeth thereon; a propeller operatively connected to said second ring; means on said container forming a bearing for said operating shaft; and a pinion on said shaft meshing with the teeth on said second mentioned ring; substantially as described.

19. A measuring container including an open mouth; a propeller located adjacent said open mouth and operative to move material into said container through said mouth, whereby the material will be packed in a measured quantity within said container; and a motor supported by said container and operatively connected to said propeller; substantially as described.

20. A measuring container including an open mouth; a propeller located adjacent said open mouth and operative to move material into said container through said mouth, whereby the material will be packed in a measured quantity within said container; a motor supported by said container opposite said mouth; and means operatively connecting said motor with said propeller; substantially as described.

21. A container including an open mouth; a propeller located adjacent said open mouth and operative to move material into said container through said mouth; a motor supported by said container opposite said mouth; and means operatively connecting said motor with said propeller, said container tapering from said mouth toward the portion which supports said motor; substantially as described.

22. A container having an open mouth, a ring adjacent said mouth and detachably connected to said container; a collar located adjacent said mouth and having an inner portion tapering toward said mouth and surrounding said ring; and a propeller operative to move material into said container through said mouth; substantially as described.

23. A device of the character described including a container having an open mouth; and a rotatable collar located adjacent said mouth and adapted to be inserted in the material with which said container is to be filled, said collar being operative due to its rotation to cut into said material in alinement with said mouth; substantially as described.

24. A container having an open mouth; a propeller adjacent said mouth; and means for applying operative power to said propeller at a position remote from the axis thereof whereby the propeller will move to convey material into said container through said mouth; substantially as described.

In testimony whereof we have signed our names to this specification in the presence of two subscribing witnesses.

CHARLES H. GENTH.
WILLIAM KLINE.

Witnesses:
CHAS. E. POTTS,
ELIZABETH GARBE.